United States Patent
Kahn

[15] 3,694,053
[45] Sept. 26, 1972

[54] NEMATIC LIQUID CRYSTAL DEVICE
[72] Inventor: Frederic Jay Kahn, Madison, N.J.
[73] Assignee: Bell Telephone Laboratories, Incorporated, Murray Hill, N.J.
[22] Filed: June 22, 1971
[21] Appl. No.: 155,435

[52] U.S. Cl. .................................350/150, 350/160
[51] Int. Cl. ...........................................G02f 1/16
[58] Field of Search ............................35/150, 160

[56] References Cited

UNITED STATES PATENTS

| 2,544,659 | 3/1951 | Dreyer | 350/155 |
| 3,364,433 | 1/1968 | Freand et al. | 330/4.6 |
| 3,551,026 | 12/1970 | Heilmeier | 350/150 |
| 3,597,043 | 3/1971 | Dreyer | 350/149 |
| 3,625,591 | 12/1971 | Freiser et al. | 350/150 |

OTHER PUBLICATIONS

Haller et al.: " Aligning Nematic Liquid Crystals," IBM Tech. Disc. Bull., Vol. 13, pg. 3237, April, 1971.
Holzman: " Liquid Crystal Light Modulator and Scanner," IBM Tech. Disc. Bull., Vol. 8, pp. 151-152, June, 1965.
Haas et al.: " New Electro. Optic Effect in a Room Temperature Nematic Liquid Crystal," Phys. Rev. Lett., Vol. 25, pp. 1326- 1327, Nov. 9, 1970.
Heilmeier et al.: " Dynamic Scattering: A New Electrooptic Effect in Certain Classes of Nematic Liquid Crystal," Proc. IEEE, Vol. 56, pp. 1162- 1171, July, 1968.

Primary Examiner—Ronald L. Wibert
Assistant Examiner—Edward S. Bauer
Attorney—R. J. Guenther et al.

[57] ABSTRACT

A device characterized by an electronically-tunable optical birefringence over the range of 0.0 to 0.2 for applied voltages below 25 volts rms includes a thin film of a nematic liquid crystal. The tunable birefringence occurs below the threshold for dynamic scattering and is the result of electric-field-induced spatially-uniform molecular reorientation in a well-aligned nematic liquid crystal. Applications for such a cell include display elements, tunable retarders, color modulators and variable density filters.

9 Claims, 4 Drawing Figures

PATENTED SEP 26 1972  3,694,053

INVENTOR
F. J. KAHN
BY Lucian C. Canepa
ATTORNEY

3,694,053

NEMATIC LIQUID CRYSTAL DEVICE

BACKGROUND OF THE INVENTION

This invention relates to nematic liquid crystals and more particularly to a nematic liquid crystal device that exhibits an electronically-tunable birefringence characteristic.

Nematic liquid crystals consist of rodlike organic molecules. On the average the long axes of these molecules are aligned parallel to each other. In a sandwich structure in which a thin film of nematic liquid crystal is confined between parallel-disposed planar members, the molecules of the film can be made to align homeotropically, that is normal to the members. In this configuration the liquid crystal is a thin film in the $xy$ plane, the film being typically between 1 and 200 microns thick in the $z$ direction.

Reorientation of the molecules of a nematic liquid crystal can be achieved in various ways. If a magnetic field H is applied in the $y$ direction of the structure assumed above and if the liquid crystal molecules have positive magnetic anisotropies, a reorientation of the molecules will occur above a critical field $H_c$. As the field is increased above $H_c$, the birefringence of the liquid crystal will vary in a continuous fashion. This known phenomenon is referred to as the Freedericksz effect. (See in this connection "Forces Causing the Orientation of an Anisotropic Liquid" by V. Freedericksz et al, *Transacactions of The Faraday Society*, pp. 919–930, 1933.)

Similar reorientations are expected for applied electric fields. (For a theoretical discussion of this effect, see "The Effect of a Magnetic Field on the Nematic State" by H. Zocher, *Transactions of The Faraday Society*, pp. 945–957, 1933.) However, experimental realization of spatially-uniform electric-field-induced reorientations is hampered by the effects of space charge and the flow of conduction currents. In general, when a dc electric field is applied to a thin layer of nematic liquid crystal, a conduction current flows. As the field is increased, the current increases and so do the fluid velocities associated with the current. Above a certain critical voltage $V_c$, typically of the order of 7 volts for the dc case, a hydrodynamic instability occurs. This results in a domain-like pattern of flow vortices which spatially modulate the refractive index of the liquid crystal and therefore scatter light. As the voltage is increased further, the vortex pattern becomes unstable, the liquid crystal material becomes turbulent and light is scattered efficiently. The material then has the cloudy appearance of ground glass. This is the well-known dynamic scattering phenomenon. (See "Liquid-Crystal Display Devices" by George H. Heilmeier, *Scientific American* pp. 100–106, April 1970.) Hydrodynamic instabilities producing light scattering also occur when ac electric fields are applied. (See "Hydrodynamic Instabilities in Nematic Liquid Crystals Under ac Electric Fields" by Orsay Liquid Crystal Group, *Physical Review Letters*, pp. 1642–1643, Dec. 14, 1970.)

In order to observe electric-field-induced spatially-uniform tunable birefringence effects analogous to those observed in response to magnetic fields, it is necessary to eliminate the aforedescribed scattering which results from hydrodynamic instabilities. Moreover, it is necessary to provide a way to order the nematic liquid crystal at zero field and also to establish a preferred direction for molecular reorientation when the field is applied.

SUMMARY OF THE INVENTION

An object of the present invention is an improved nematic liquid crystal device.

More specifically, an object of this invention is a low-cost, low-power, birefringence-tunable nematic liquid crystal device that is characterized by a long-lifetime, zero retardation at zero voltage, a well-defined threshold and relatively short relaxation times.

Briefly, these and other objects of the present invention are realized in a specific illustrative embodiment thereof that comprises a nematic liquid crystal device exhibiting a birefringence that is electronically tunable over a range of applied voltages that lie below the threshold for light scattering due to hydrodynamic instabilities. In constructing the device, the molecules of a thin film of a member of a specified class of nematic liquid crystals are initially ordered in a homeotropic way. Moreover, the device is constructed to create a preferred anisotropy direction in the thin film. This in turn imposes a predetermined molecular orientation in the film in the presence of an applied electric field. Hence when an electric field is applied to the device, the homeotropically-ordered molecules are reoriented in the preferred direction. In this way a spatially-uniform reorientation of a portion of the molecules in the thin film is achieved under the influence of an applied electric field. As a result, the birefringence of the device is thereby selectively altered in a controlled manner.

A feature of the present invention is that the molecules of a thin film of a nematic liquid crystal are, in the absence of an electric field, homeotropically ordered. Moreover, it is a feature of this invention that a preferred anisotropy direction is initially imposed on the molecules so that in the presence of an electric field any reoriented molecules are constrained to align themselves in the preferred direction.

DETAILED DESCRIPTION

Figure 1:
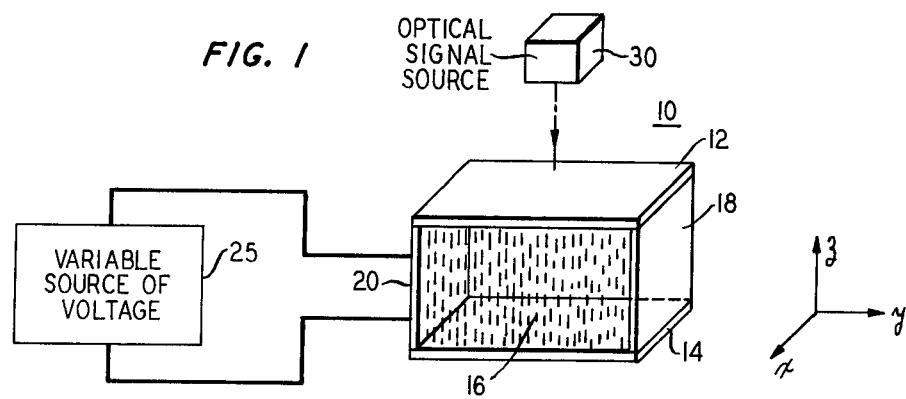
FIG. 1 is a diagrammatic representation of a specific illustrative nematic liquid crystal device made in accordance with the principles of the present invention.

The specific illustrative liquid crystal device shown in FIG. 1 includes two parallel glass plates 12 and 14 having a thin film 16 of nematic liquid crystal sandwiched between them. Thin conductive coatings of, for example, $In_2O_3$—$SnO_2$ on the facing surfaces of the plates 12 and 14 provide electrodes by means of which a uniform electric field can be established across the depicted film. Polymeric spacers 18 and 20 made, for example, of Mylar maintain the thickness of the liquid crystal material at any desired value in a range of approximately 1 to 200 microns measured in the $z$ direction. Thus, the liquid crystal is in effect a thin film lying in the xy plane.

In accordance with the principles of the present invention, the active material 16 included in the device 10 of FIG. 1 comprises a nematic liquid crystal of a specified type. In particular the material is a nematic liquid crystal of the type in which the electric susceptibility $\chi$ perpendicular to the long axis of a molecule thereof is greater than the electric susceptibility parallel to the long molecular axis ($\chi_\perp > \chi_\parallel$). N − (p − methoxybenzylidene) − p − butylaniline (hereinafter identified as MBBA) is an example of one such nematic liquid crystal material suitable for inclusion in the device 10.

The rodlike molecules of the nematic liquid crystal 16 shown in FIG. 1 are designated by short lines. These lines represent the long axes of the molecules. In accordance with this invention, the long axes of the molecules of the thin film are initially oriented parallel to the z axis. Such an orientation or homeotropic ordering is achieved either by mixing a surfactant additive with the nematic liquid crystal material or by directly coating the facing electrode surfaces of the planar members 12 and 14 with an appropriate surfactant.

Surfactants which have been found to induce good hometropic order in nematic liquid crystals include hexadecyltrimethyl ammonium bromide (hereinafter identified as HMAB), stearic acid, lecithin and polyamide resins such as, for example, Versamide 100. (Versamid 100 is sold by General Mills, Kankakee, Illinois.) A tentative explanation of why such surfactants impose homeotropic order on nematic liquid crystals follows. The surfactant molecules generally each have one end which is polar in character and one end which is non-polar, for example a hydrocarbon chain. The polar end tends to adhere to the electrode surface while the non-polar end interacts with the liquid crystal molecules in such a way as to orient them homeotropically.

Thus, for example, homeotropic ordering of MBBA may be achieved by adding thereto a small amount of HMAB. The resulting mixture is flowed between the planar members (by capillary action, for example). It is believed that the HMAB molecules then plate out on the planar members. This plating action can be accelerated by momentarily heating the liquid crystal material (to about 50° C., for example) and then allowing it to cool to room temperature. For 12-micron-thick samples the optimal concentration of HMAB in MBBA is about 0.005 percent by weight. If all the HMAB is assumed to plate out, this would correspond to a uniform coating on the order of a monolayer on each electrode surface.

The effect of an additive to cause homeotropic ordering in the resulting nematic liquid crystal mixture is known in the art. In this connection, see, for example, "New Electro-Optic Effect in a Room Temperature Nematic Liquid Crystal" by W. Haas et al, *Physical Review Letters*, Nov. 9, 1970. pp. 1326–1327.

Alternatively, homeotropic ordering of a material such as MBBA may be achieved by directly depositing a thin layer of, for example, HMAB on the aforementioned electrode surfaces. This direct deposition method has been found to provide more uniform homeotropic ordering than the aforementioned additive method. A uniform surfactant layer may be obtained by dissolving the surfactant in an appropriate organic solvent, spraying the solution on the electrode surfaces and allowing the solvent to evaporate.

Thus, for example, a solution of approximately 0.006 percent by weight of HMAB in a volatile solvent comprising one part chloroform and one part petroleum ether by volume was sprayed with a Crown Spra-tool Power Pak (Crown Industrial Products, Hebron, Illinois) onto the electrodes from a distance of about 7 to 10 inches. The resulting uniform coating had a estimated density of 4 micrograms of HMAB per square centimeter of surface area. Electrodes thus coated produced highly uniform homeotropic ordering.

That the above-described procedures are indeed effective to establish homeotropic ordering of the molecules of the thin film 16 can be experimentally verified. By viewing the film 16 between crossed polarizers in convergent light directed along the z axis, one sees the characteristic conoscopic figure corresponding to that of an optically uniaxial crystal which has its optic axis perpendicular to the electrode surfaces coated on the members 12 and 14.

To create a preferred anisotropic direction in the nematic liquid crystal thin film, which in turn will give rise to a predetermined molecular orientation in the presence of an electric field applied thereto, a further preparation step is required in the course of fabricating the device represented in FIG. 1. This step involves selectively treating the electrode layers that are respectively deposited on the planar members 12 and 14. Illustratively, the treatment comprises rubbing the electrodes, for example with lens paper, in a direction parallel to the direction in which the molecular axes of the thin film are to lie in the presence of an applied electric field. Rubbing each of the electrode surfaces in the y direction about six times with moderate pressure has resulted in imposing the desired anisotropic direction in the thin film 16. In carrying out this step neither the rubbing material, the number of strokes, nor the amount of pressure appears to be critical. The rubbing as described above is carried out prior to deposition of the surfactant.

An entirely satisfactory model representative of the mechanism involved in the aforedescribed rubbing step has not yet been developed. It appears that the initial rubbing treatment causes a small fraction of the molecules (a fraction of those closest to the electrode surfaces) to be oriented in an ordered fashion with their long axes parallel to each other, parallel to the planar members and parallel to the y axis. Significantly, the rubbing has but a minimal effect on the initially-established homeotropic ordering. Subsequently, when an electric field perpendicular to the planar members is applied to the cell (in the z direction) the homeotropically-ordered molecules are reoriented. The direction of the reorientation is determined by the initially-ordered molecules closest to the electrodes. In this way a spatially-uniform reorientation of a portion of the molecules is achieved in the thin film under the influence of an applied electric field. Spatial uniformity is in the xy plane for fields applied normal to the plane of the film, that is applied such that the field has a component parallel to the z axis.

The term "spatially-uniform" is to be construed herein as being applicable to and descriptive of a scale of distances in the xy plane that is large (for example 10 times greater) compared to the thickness of the thin film 16.

Processes other than the above-described rubbing can impose on the nematic liquid crystal thin film a preferred direction for molecular reorientation. For example, depositing a suitable surfactant on the electrode surfaces in an ordered manner can serve both to establish a homeotropic arrangement of the molecules of the film and at the same time to define a preferred direction for molecular reorientation in the presence of an electric field.

One other illustrative way in which to establish the preferred direction for molecular reorientation is to utilize a permanent magnetic film for one of the electrodes of the depicted device. In that case the magnetic field established thereby, directed for example along the y axis, will determine the preferred reorientation direction.

The birefringence characteristic of the device 10 shown in FIG. 1 can be controllably altered by establishing an electric field in the thin film 16. A variable dc field whose value is below the threshold for dynamic scattering can be employed for this purpose. However, the range of tunable birefringence that is thereby obtained is relatively limited. In accordance with this invention, the range of tunable birefringence is significantly expanded by using ac electric fields.

Figure 3:
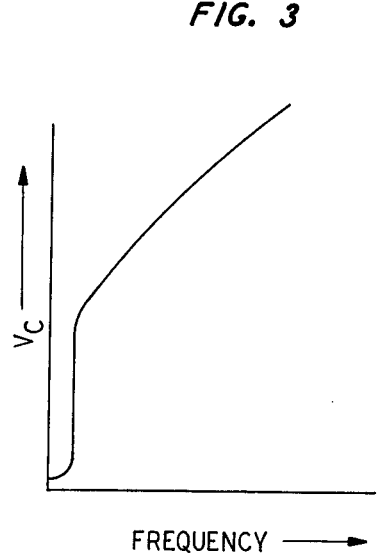

FIG. 3 illustrates for a particular sample the manner in which $V_c$, the voltage threshold for hydrodynamic instability, increases as the frequency of the voltage applied to a nematic liquid crystal is increased. Thus, by applying ac electric fields to the thin film 16 shown in FIG. 1, it is possible to make devices which are tunable over virtually the full available birefringence characteristic of the nematic liquid crystal material, but which operate at all times below the threshold for hydrodynamic instability.

Another advantage of ac operation of the device shown in FIG. 1 is that the larger fields thereby made possible lead to relatively short turn-on times in the nematic liquid crystal film device 10.

The preceding description applies to nematic liquid crystal materials in which $\epsilon_{ao} < \epsilon_a < 0$, where $\epsilon_a$, the dielectric anisotropy, is defined by the expression $\epsilon_a = 4\pi(\chi_\parallel - \chi_\perp)$ and $\epsilon_{ao}$ is a material parameter defined in the Orsay reference cited below. However, for materials in which $\epsilon_a < \epsilon_{ao} < 0$ there will be no hydrodynamic instabilities of the Carr-Helfrich or dielectric type. (See "Hydrodynamic Instabilities of Nematic Liquid Crystals Under A.C. Electric Fields," by E. Dubois-Violette, P. G. de Gennes and O. Parodi, Orsay Liquid Crystal Group, Orsay, France. This is reference No. 10 in the previously-cited Orsay paper and is available on request from the Orsay Group.) Thus, the birefringence of devices incorporating such latter materials can be controllably altered with electric fields of arbitrary strength and frequency provided care is taken to eliminate Felici instabilities (for example by using high-resistivity samples).

Figure 4:
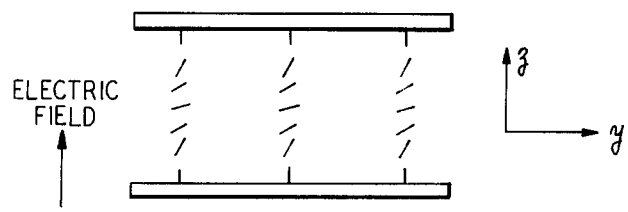
FIG. 4 depicts the manner in which the nematic liquid crystal molecules in the FIG. 1 device are reoriented in response to an applied electric field.

A source 25 is shown in FIG. 1 for applying variable voltages between the electrode surfaces respectively disposed on the members 12 and 14. By that means, variable electric fields can be established in the nematic liquid crystal material 16. In the presence of an applied field in the z direction, some of the homeotropically-oriented molecules of the material are rotated in a spatially-uniform manner (spatially uniform in the xy plane) toward the y axis. This reorientation, which is represented schematically in FIG. 4, gives rise in turn to a change in the birefringence characteristic of the device 10. Thus, optical signals directed at the device 10 by a source 30 (FIG. 1) "see" a birefringence characteristic whose value is a function of the voltage applied across the thin film 16.

Figure 2:
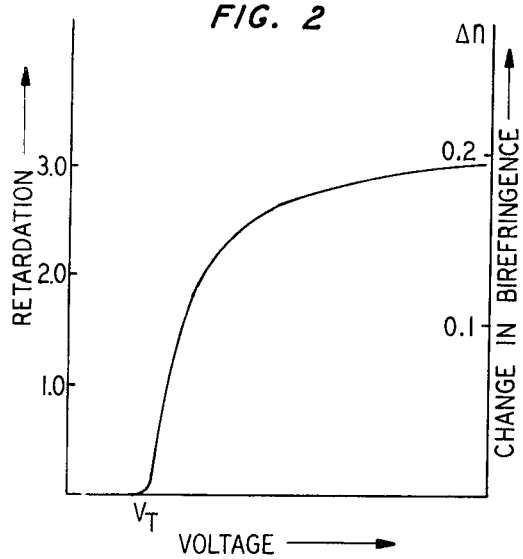
FIGS. 2 and 3 are graphs that are helpful in describing the nature of the device shown in FIG. 1.

A typical curve of $\Delta n$ (birefringence) versus applied voltage for a specific 16-micron thick film of nematic liquid crystal excited at 1 KHZ with an electric field in the z direction is shown in FIG. 2. In such a specific device (of the type shown in FIG. 1) the voltage threshold $V_T$ at which a change in birefringence is first observed approximates 3.85 volts rms and is well defined. This threshold corresponds to an electric Freedericksz transition. Theoretical analysis shows that this threshold is determined by the elastic constants and the dielectric anisotropy of the nematic liquid crystal. Observed values are typically in the range 3 to 4 volts for a variety of different samples.

FIG. 2 also indicates the variation of optical retardation with applied voltage for the above-specified example. The retardation is zero at zero applied voltage and approaches 3 microns at an optical wavelength of 546 nanometers when the applied voltage reaches about 24 volts rms. Just above $V_T$ the differential change in retardation is about 1.25 microns per volt rms. The advantageous low-voltage nature of the described device is apparent. For example, retardations greater than 1 micron can be obtained with applied voltages less than 5 volts rms.

It is apparent to workers in the optical signal processing art that a tunable birefringence device of the particular type described herein has a number of useful and practical applications. For example, if a device made in accordance with this invention is positioned between either crossed or parallel polarizers whose axes are disposed at 45° with respect to the axes of the tunable birefringence device, a color and/or intensity modulator results. If the nematic liquid crystal molecules included in the device 10 of FIG. 1 are in turn used to control the orientation of pleochroic dye molecules or other optically anisotropic particles (in this connection see G. H. Heilmeier Pat. No. 3,551,026, issued Dec. 29, 1970), a variable density filter is obtained. Furthermore, by operating the device 10 in either conventional transmission or reflection modes, other arrangements of practical value may be formulated.

Finally, it is to be understood that the abovedescribed structures are only illustrative of the application of the principles of the present invention. In accordance with these principles, numerous other arrangements may be devised by those skilled in the art without departing from the spirit and scope of the invention. For example, although emphasis herein has been directed to the use of MBBA as the nematic liquid crystal, it is to be understood that a variety of alternative materials with negative dielectric anisotropies may be substituted therefor. Furthermore, it is advantageous to use materials which exhibit relatively high resistivities. A high-resistivity characteristic minimizes current flow and electrochemical processes and thereby results in devices with extended lifetimes.

What is claimed is:

1. In combination,
   a thin film of a nematic liquid crystal having long molecules which are characterized by greater electric susceptibilities perpendicular to their long axes than parallel thereto,
   means for initially orienting the long axes of said molecules parallel to a reference direction,
   and means for imposing a preferred reorientation direction on said molecules so that in the presence of an electric field having an electric field component parallel to said reference direction any molecules that are reoriented by said field will tend to align themselves in a spatially-uniform manner in said preferred reorientation direction.

2. A combination as in claim 1 wherein said means for initially orienting comprises a homeotropic-inducing additive mixed with said nematic liquid crystal.

3. A combination as in claim 2 wherein said nematic liquid crystal comprises MBBA and said means for initially orienting comprises 0.005 percent by weight of HMAB added to said MBBA.

4. A combination as in claim 1 wherein said means for initially orienting comprises homeotropic-inducing layers in contact with the opposed major surfaces of said thin film of nematic liquid crystal.

5. A combination as in claim 1 wherein said means for imposing a preferred reorientation direction comprises electrode layers in contact with the opposed major surfaces of said thin film of nematic liquid crystal.

6. A combination as in claim 5 wherein said electrode layers have been selectively treated by rubbing them in the preferred direction.

7. A combination as in claim 5 further including means connected to said electrode layers for establishing in said thin film a variable electric field.

8. A combination as in claim 7 wherein said means connected to said electrode layers establishes therebetween a variable ac electric field.

9. A tunable birefringence device comprising
   a thin film of a nematic liquid crystal that is characterized by long molecules whose electric susceptibility perpendicular to the long axes of the molecules is greater than the electric susceptibility parallel to the long axes of the molecules, said thin film lying in an $xy$ plane,
   means for establishing a variable ac electric field in said thin film in the $z$ direction, which is perpendicular to said $xy$ plane,
   means for quiescently ordering the molecules of said thin film in the absence of an electric field such that the long axes of substantially all of said molecules are aligned parallel to said $z$ direction,
   and means for quiescently imposing a preferred orientation direction on the molecules of said thin film such that when an electric field is applied thereto a portion of the molecules of said thin film are rotated in a spatially-ordered manner to an orientation in which the long axes thereof are parallel to each other and to said $xy$ plane.

* * * * *

UNITED STATES PATENT OFFICE
CERTIFICATE OF CORRECTION

Patent No. 3,694,053     Dated September 26, 1972

Inventor(s) Frederic Jay Kahn

It is certified that error appears in the above-identified patent and that said Letters Patent are hereby corrected as shown below:

Claim 3, change "2" to --1--.

Claim 4, change "1" to --2--.

Signed and sealed this 13th day of February 1973.

(SEAL)
Attest:

EDWARD M. FLETCHER, JR.　　　　　　　ROBERT GOTTSCHALK
Attesting Officer　　　　　　　　　　Commissioner of Patents